United States Patent
Jain

(10) Patent No.: US 10,700,863 B2
(45) Date of Patent: Jun. 30, 2020

(54) SHARED KEYS BASED ON MULTIPLE FEATURES

(71) Applicant: Aetna Inc., Hartford, CT (US)

(72) Inventor: Salil Kumar Jain, Jackson Heights, NY (US)

(73) Assignee: Aetna Inc., Hartford, CT (US)

( * ) Notice: Subject to any disclaimer, the term of this patent is extended or adjusted under 35 U.S.C. 154(b) by 0 days.

(21) Appl. No.: 16/396,064

(22) Filed: Apr. 26, 2019

(65) Prior Publication Data

US 2019/0253248 A1    Aug. 15, 2019

Related U.S. Application Data

(63) Continuation of application No. 15/296,568, filed on Oct. 18, 2016, now Pat. No. 10,326,593.

(Continued)

(51) Int. Cl.
*H04L 29/06* (2006.01)
*G06F 21/60* (2013.01)
*H04L 9/14* (2006.01)
*H04L 9/08* (2006.01)
*H04L 9/28* (2006.01)

(52) U.S. Cl.
CPC ............... *H04L 9/14* (2013.01); *H04L 9/085* (2013.01); *H04L 9/0866* (2013.01); *H04L 63/0435* (2013.01); *H04L 63/0861* (2013.01); *H04L 63/06* (2013.01); *H04L 2463/061* (2013.01)

(58) Field of Classification Search
CPC ......... H04L 9/085; H04L 9/0866; H04L 9/14; H04L 9/3231; H04L 9/3271; H04L 2209/34; H04L 2463/061; H04L 2463/63; H04L 2463/0435; H04L 2463/06; H04L 63/0861; G06F 15/17331; G06K 9/00093
See application file for complete search history.

(56) References Cited

U.S. PATENT DOCUMENTS 7,257,844 B2    8/2007  Woodward
2006/0083372 A1    4/2006  Chang et al.
(Continued)

OTHER PUBLICATIONS

Lin You, Guowei Zhang and Fan Zhang, "A fingerprint and threshold scheme-based key generation method," 5th International Conference on Computer Sciences and Convergence Information Technology, Seoul, 2010, pp. 615-619. (Year: 2010).*

(Continued)

*Primary Examiner* — Michael Simitoski
(74) *Attorney, Agent, or Firm* — Leydig, Voit & Mayer, Ltd.

(57) ABSTRACT

A method for secret sharing utilizing multiple features of an input includes: receiving a registration input; obtaining features from the registration input; generating a secret key and a plurality of shared keys according to a shared secret scheme; associating each of the plurality of shared keys with a respective feature of the registration input; generating a plurality of additional features associated with additional keys having a similar format as a shared key associated with a respective feature; storing the plurality of shared keys associated with respective features together with the plurality of additional keys associated with additional features; and encrypting an element to be protected by the secret key using the secret key.

20 Claims, 11 Drawing Sheets

Related U.S. Application Data

(60) Provisional application No. 62/354,324, filed on Jun. 24, 2016, provisional application No. 62/360,692, filed on Jul. 11, 2016.

(56) References Cited

U.S. PATENT DOCUMENTS

| | | |
|---|---|---|
| 2009/0310779 A1 | 12/2009 | Lam et al. |
| 2014/0325309 A1 | 10/2014 | Resch et al. |
| 2016/0105285 A1 | 4/2016 | Jakobsson |
| 2016/0253521 A1 | 9/2016 | Esmailzadeh et al. |
| 2016/0269186 A1* | 9/2016 | Wallrabenstein ....... G06F 21/31 |
| 2017/0063559 A1* | 3/2017 | Wallrabenstein ..... H04L 9/3066 |

OTHER PUBLICATIONS

"REZA Key Encoding & Decoding," Brochure, EyeVerify Inc. (2015).

Monrose et al. "Cryptographic key generation from voice," *Proceedings of the IEEE Symposium on Security and Privacy* (May 2001).

Teoh et al. Personalised cryptographic key generation based on FaceHashing, *Computers & Security*, vol. 23, 606-614 (2004).

You et al., "A cryptographic key binding method based on fingerprint features and the threshold scheme," *International Journal of Advancements in Computing Technology*, 3(4), 21-31 (May 2011).

\* cited by examiner

SHARED KEYS BASED ON MULTIPLE FEATURES

CROSS-REFERENCE TO RELATED APPLICATIONS

This patent application is a continuation of copending U.S. patent application Ser. No. 15/296,568, filed Oct. 18, 2016, which claims the benefit of U.S. Provisional Patent Application No. 62/354,324, filed Jun. 24, 2016, and U.S. Provisional Patent Application No. 62/360,692, filed Jul. 11, 2016. All of the foregoing patent applications are incorporated by reference herein in their entireties.

BACKGROUND

Conventional authentication systems, such as biometric authentication systems, typically depend on matching a pre-registered template with a current input, such as matching an input biometric image to a stored biometric template. Oftentimes, the matching is based on deriving features from the current input, such as deriving features of an input image of a person's face, and comparing the derived features to pre-registered features corresponding to the same person.

Since the matching operation is typically a Boolean operation (i.e., outputting either a result of successful matching or a result of unsuccessful matching), it may be possible for an unauthorized user to generate a successful authentication result, which corresponds to successful matching, without providing a valid input, through a relatively simple bypass of the matching operation.

Additionally, if an unauthorized user gains access to the stored pre-registered template or features, the unauthorized user may be able to use that information to illegitimately generate a successful authentication result.

SUMMARY

In an exemplary embodiment, the invention provides a non-transitory computer-readable medium having processor-executable instructions stored thereon for secret sharing utilizing multiple features of an input, the processor-executable instructions, when executed, facilitating performance of the following: receiving a registration input; obtaining features from the registration input; generating a secret key and a plurality of shared keys according to a shared secret scheme; associating each of the plurality of shared keys with a respective feature of the registration input; generating a plurality of additional features associated with additional keys having a similar format as a shared key associated with a respective feature; storing the plurality of shared keys associated with respective features together with the plurality of additional keys associated with additional features; and encrypting an element to be protected by the secret key using the secret key.

In another exemplary embodiment, the invention provides a method for secret sharing utilizing multiple features of an input, the method comprising: receiving, by a computing system, a registration input; obtaining, by the computing system, features from the registration input; generating, by the computing system, a secret key and a plurality of shared keys according to a shared secret scheme; associating, by the computing system, each of the plurality of shared keys with a respective feature of the registration input; generating, by the computing system, a plurality of additional features associated with additional keys having a similar format as a shared key associated with a respective feature; storing, by the computing system, the plurality of shared keys associated with respective features together with the plurality of additional keys associated with additional features; and encrypting, by the computing system, an element to be protected by the secret key using the secret key.

In yet another exemplary embodiment, the invention provides a non-transitory computer-readable medium having processor-executable instructions stored thereon for secret sharing based on multiple features of an input, the processor-executable instructions, when executed, facilitating performance of the following: receiving a registration input; obtaining a plurality of keys based on features of the registration input; generating a secret key and a plurality of shared keys according to a shared secret scheme; generating a plurality of unique responses based on the plurality of shared keys and on one or more plain responses; generating a plurality of challenges based on applying each of the keys based on features of the registration input to each of the plurality of unique responses; storing the one or more plain responses and the plurality of challenges; and encrypting an element to be protected by the secret key using the secret key.

In yet another exemplary embodiment, the invention provides: a method for secret sharing based on multiple features of an input, wherein the method comprises: receiving, by a computing system, a registration input; obtaining, by the computing system, a plurality of keys based on features of the registration input; generating, by the computing system, a secret key and a plurality of shared keys according to a shared secret scheme; generating, by the computing system; a plurality of unique responses based on the plurality of shared keys and on one or more plain responses; generating, by the computing system, a plurality of challenges based on applying each of the keys based on features of the registration input to each of the plurality of unique responses; storing, by the computing system, the one or more plain responses and the plurality of challenges; and encrypting, by the computing system, an element to be protected by the secret key using the secret key.

BRIEF DESCRIPTION OF DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the invention integrate features of an input together with a shared secret scheme in an authentication system for granting access to a network or system or to data based on possession of a secret key (e.g., by encrypting an authentication token such that access to a system is only granted in the event of successful decryption of the authentication token using the secret key, or by encrypting data in a manner such that the secret key is required to decrypt the encrypted data).

The secret key that is based on a shared secret scheme, wherein a user must be in possession of at least a minimum number of shared keys to derive the secret key. By using the shared key scheme in connection with features of an input, multiple layers of security are provided which make it very difficult, if not impossible, for an unauthorized user to illegitimately gain access to the protected network/system or to the protected data.

Embodiments of the invention allow for some tolerance for environmental and other conditions that may cause a valid input to differ slightly from a pre-registered input. In the shared secret scheme, if there are a total number N of shared keys, an authorized user need only be in possession of a minimum number K of the shared keys to successfully derive the secret key. Thus, when a current, valid input is provided with sufficient overlapping features relative to a pre-registered input, the features of the current input do not need to exactly match all the features of the pre-registered input. So long as a sufficient number of features of the current input match the features of the pre-registered input, the minimum number K of shared keys needed for deriving the secret key can be obtained based on the current input. In the event that a current input provided to the system does not sufficiently match a pre-registered input (i.e., the system is not able to obtain a minimum number K of the shared keys based on the current input), the system will not be able to derive the secret key.

It will be appreciated that the number K should be set to be sufficiently high to generally avoid false positives, while not being set so high as to cause too many false negatives. It will further be appreciated that the magnitude of K may vary for different applications (e.g., K may be set relatively lower in less sensitive applications where some degree of false positives are acceptable to avoid annoyance to users due to false negatives, and K may be set relatively higher in more sensitive applications where false positives are less acceptable). In an exemplary implementation, K may be set to be 70% of N such that a current input having at least 70% of features in common with the N pre-registered features of a pre-registered input will enable the system to derive the secret key.

Figure 1A:
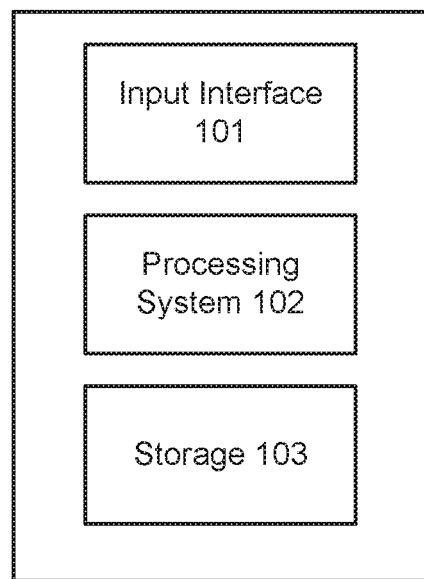
FIGS. 1A-1C illustrate exemplary environments in which embodiments of the invention may be implemented.
Figure 1B:
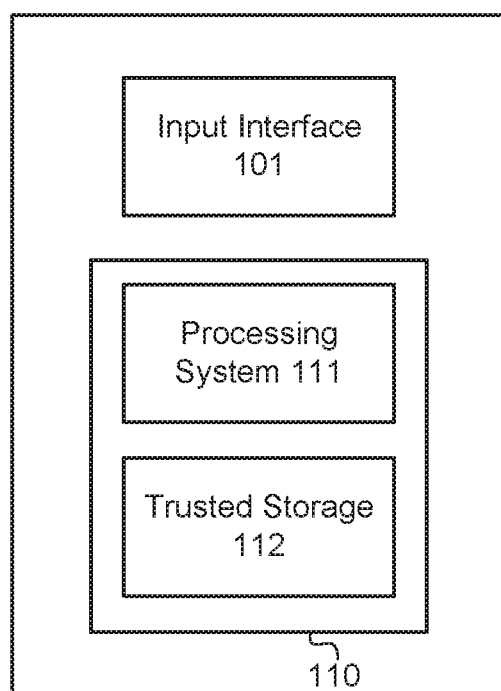
Figure 1C:
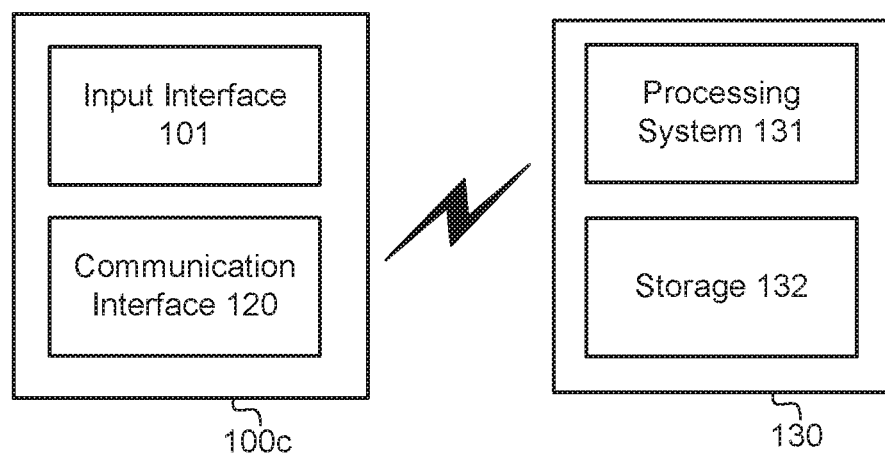

FIGS. 1A-1C illustrate exemplary environments in which embodiments of the invention may be implemented.

FIG. 1A is a block diagram illustrating a device 100a having an input interface 101 (e.g., a camera, a fingerprint reader, etc.) through which a user may provide an input for registration and/or authentication. A processing system 102 of the device 100a, including one or more processors, is configured to process the input for registration and/or authentication of the user, e.g., by executing a software application. A storage 103 of the device 100a may be used to store features, shared key parameters, and/or challenges-response pairs, as well as processor-executable instructions to be executed by the processing system 102.

FIG. 1B is a block diagram illustrating a device 100b having an input interface 101 through which a user may provide an input for registration and/or authentication (e.g., a camera, a fingerprint reader, etc.). The device may further include a trusted hardware module 110 (e.g., a subscriber identity module (SIM) card or a separate chip specifically designed to provide the trusted hardware module) having a processing system 111, including one or more processors, configured to process the input for registration and/or authentication of the user and a trusted storage 112 for storing features, shared key parameters, and/or challenges-response pairs, as well as processor-executable instructions to be executed by the processing system 111. It will be appreciated that device 100b may further include a device processing system and a device storage separate from the trusted hardware module 110 (not depicted).

FIG. 1C is a block diagram illustrating a device 100c having an input interface 101 through which a user may provide an input for registration and/or authentication (e.g., a camera, a fingerprint reader, etc.), as well as a communication interface 120 for communicating with server 130. The device 100c sends, via communication interface 120, an input obtained through input interface 101 to the server 130 (e.g., over a communications network such as the internet), and a processing system 131 of the server 130, including one or more processors, is configured to process the input for registration and/or authentication of the user in connection with a storage 132 of the server for storing features, shared key parameters, and/or challenges-response pairs, as well as processor-executable instructions to be executed by the processing system 131. The communications between the device 100c and server 130 may be encrypted.

It will be appreciated that relevant components are depicted in FIGS. 1A-1C for illustration purposes, and that devices 100a, 100b, 100c and server 130 may further include various other components familiar to those of ordinary skill in the art. It will further be appreciated that the environments depicted in FIGS. 1A-1C are merely exemplary, and that embodiments of the invention are not limited thereto. For example, embodiments of the invention may be used in other computing and networking environments where it is advantageous to limit access to certain processes, components, systems or data to authorized users.

It will further be appreciated that the execution of various machine-implemented processes and steps described herein may occur via the computerized execution of processor-executable instructions stored on a non-transitory computer-readable medium (e. RAM, ROM, PROM, volatile, non-volatile, or other electronic memory mechanisms) by one or more corresponding processor(s).

Figure 2A:
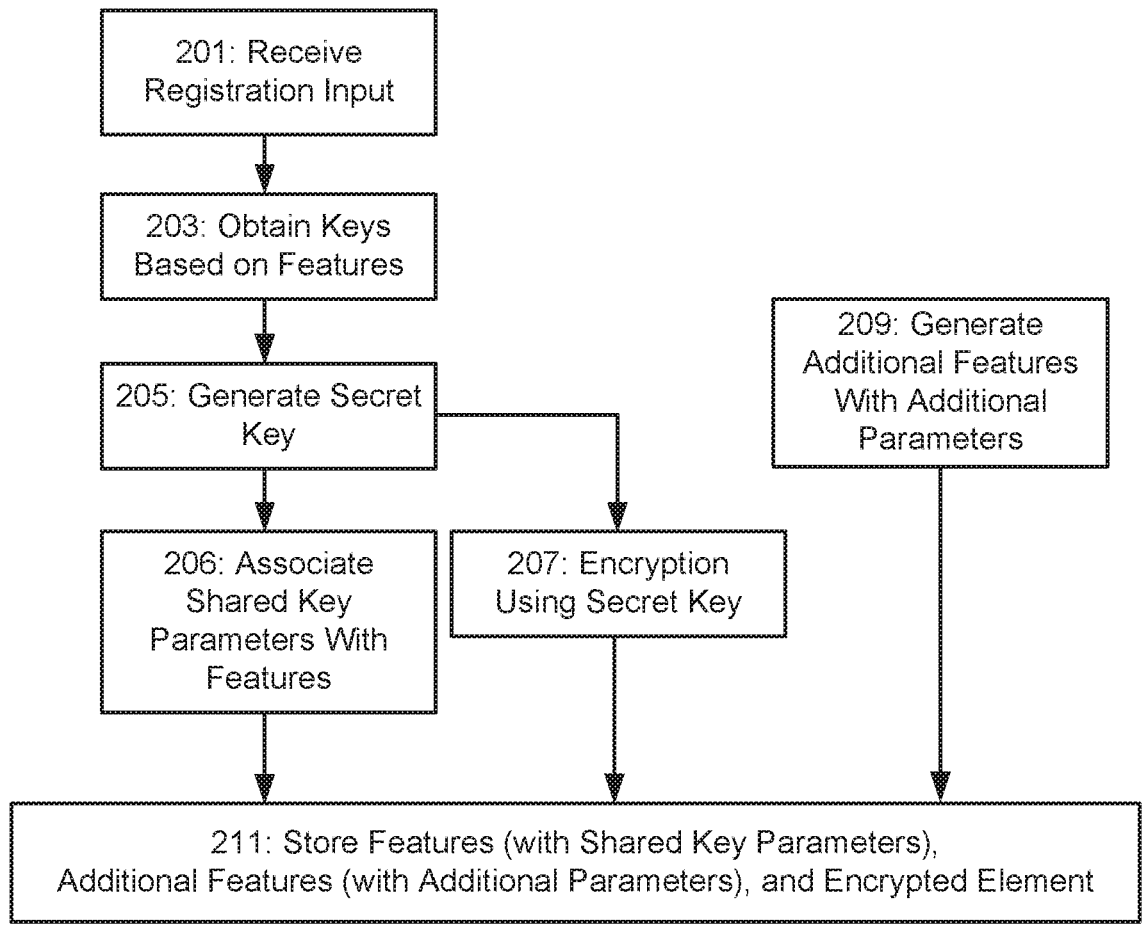
FIG. 2A is a flowchart illustrating an exemplary process for registration of an input.

FIG. 2A is a flowchart illustrating an exemplary process 200a for registration of an input according to an exemplary embodiment. For example, in a biometric-based system, an authorized user may register an input such as an image of the user's face, palm, or fingerprint, so as to allow the registered input be used later to authenticate the user and provide the user with access to a protected network or system or to allow the user to decrypt protected data.

At stage 201, a registration input is provided to a processing system for registration. For example, in a biometric authentication system, an image of a user's face, palm, or fingerprint may be captured. In another example, a user may choose a non-biometric input, such as an image or a song.

At stage 203, a number of shared keys corresponding to features of the registration input are obtained (e. N shared keys corresponding to N features of the registration input). In an exemplary embodiment, the features of the registration input themselves are used as the shared keys. In another exemplary embodiment, the features of the registration input may be vectors of any dimension, and binary concatenation of all the dimensions of a feature vector may be used to convert a feature into a shared key. In yet another exemplary embodiment, a hashing algorithm along with a unique salt may be used to derive a shared key after the concatenation of dimensions of a feature vector.

At stage 205, a secret key is generated from the N shared keys according to a shared secret scheme, along with a shared key parameter for each of the N shared keys. In an exemplary implementation, Shamir's scheme is used to generate the secret key and the shared key parameters.

At stage 206, each of the features is associated with the shared key parameter corresponding to the respective feature. For example, an extra dimension may be added to each feature, with the shared key parameter corresponding to that feature being stored in the extra dimension.

At stage 207, an element is encrypted using the secret key. For example, in an exemplary application where the secret key is used to limit access to a protected network or system, the element may be a security token. In another example, in an exemplary application where the secret key is used to limit access to protected data, the element may be data that is to be protected using the secret key. In other examples corresponding to other exemplary applications, encryption of other elements may also be performed using the secret key.

At stage 209, additional features are generated for storage together with the pre-registered features. In various exemplary embodiments, these additional features may be randomly generated, may be derived from the N pre-registered features, may be generated a minimum distance from the N pre-registered features, or may be generated using some other criteria. These additional features may have a similar or same format as the pre-registered features so as to be indistinguishable from the pre-registered features to a potential attacker. Further, at stage 209, additional parameters having a similar or same format as the shared key parameters are generated and associated with the additional features in the same manner as in stage 206. Thus, for example, if the shared key parameters are associated with the features of the registration input by adding an extra dimension to the features and storing the shared key parameters therein, the additional features may be generated with each having an extra dimension for storing an additional parameter of a similar or same format as the shared key parameters.

At stage 211, the N pre-registered features of the registration input, together with the shared key parameters (which may, for example, stored in an extra dimension of each corresponding feature) are stored together with the additional features (with additional parameters) generated in stage 209. Further, the encrypted element is also stored (the storage of the encrypted element may be separate from or together with the storage of the pre-registered and additional features).

In an exemplary embodiment, the secret key generated at stage 205 is not stored, and in embodiments where the shared keys are not the pre-registered features themselves, the shared keys obtained at stage 203 may also not be stored. Thus, the security of the system is enhanced because the secret key itself is not stored and because the storage of the additional features generated at stage 209 insert noise for the storage of the N pre-registered features. If only the N pre-registered features were stored, an unauthorized user which gains illegitimate access to the storage may be able to use those N pre-registered features to derive the secret key. However, by adding additional features to the storage of the N pre-registered features, an unauthorized user will not be able to rely on illegitimate access to the storage to obtain the secret key because the unauthorized user will not know which subset of features is needed to derive the secret key (i.e., attempting to derive the secret key using a set of keys that includes a shared key based on one of the additional features will not be successful).

By adding the additional features, the total number of features stored in the database will be P=N+A (i.e., total number of features P=N pre-registered features+A additional features). The amount of work for an attacker to correctly find K shared keys out of P possible keys can be expressed as $^{P}C_{K}$, which corresponds to a number of bits for security b, where $b=\log_2(^{P}C_{K})$. The number of additional features to use may thus be chosen based on the desired security level for a particular application. The more additional features are inserted, the higher P will be, and the higher the security will be (but it will be appreciated that higher security may come with a cost of higher storage and longer processing times as a tradeoff).

Figure 2B:
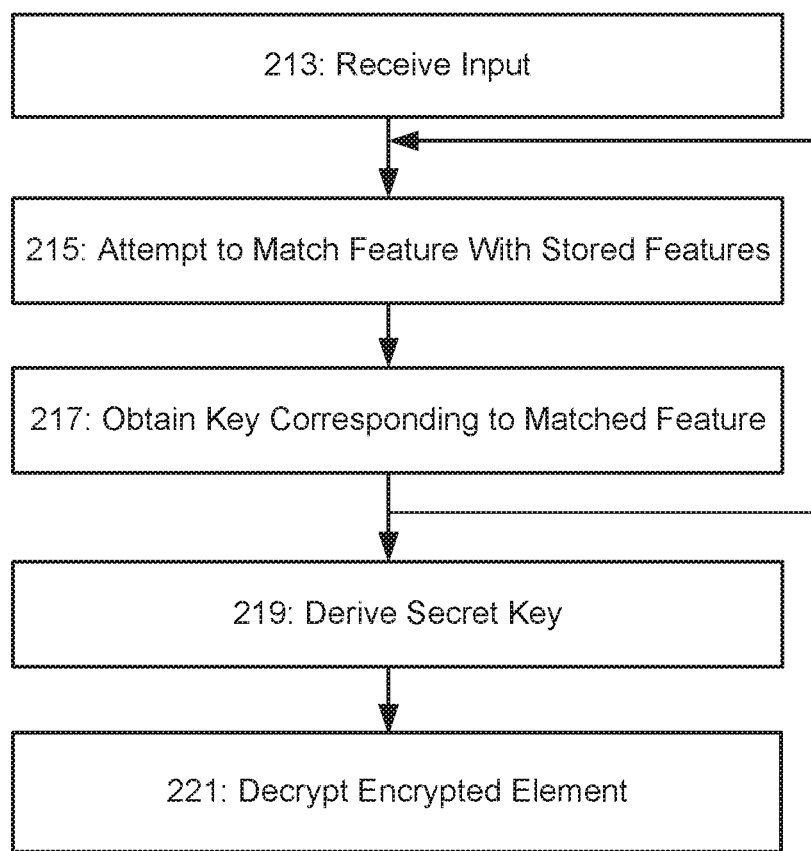
FIG. 2B is a flowchart illustrating exemplary process for deriving and using a secret key based on an input.

FIG. 2B is a flowchart illustrating an exemplary process 200b for deriving and using the secret key based on a valid, current input. The process 200b of FIG. 2B occurs after a registration input has been provided and processed according to process 200a of FIG. 2A, for example, in a situation where the user now wants to access a protected network or system or protected data after a user has registered an input for accessing the network/system/data.

At stage 213, the user provides a valid, current input corresponding to a previously registered input. For example, in a biometric system, the user may present his or her face, his or her palm, or his or her fingerprint to an input interface of the biometric system based on whether he or she previously registered a face, palm or fingerprint.

At stage 215, each feature of the current input is compared with stored features (including the pre-registered features and the additional features) to determine whether there is a match. In exemplary embodiments where the stored features have an extra dimension corresponding to a shared key parameter or additional parameter, the comparison is performed between each feature of the current input and the stored features without the extra dimension.

In an exemplary implementation, the system may look for an exact match at stage 215. In another exemplary implementation, the system may perform a distance computation to determine a match when the input feature is within a certain distance R from a stored feature at stage 215.

At stage 217, a shared key is obtained based on a feature if there is a match. In the exemplary implementation where the system looks for an exact match, either the input feature or the stored feature may be used as the basis for the shared key (since they are the same), and in the exemplary implementation where the system uses a distance computation, the stored feature may be used as the basis for the shared key (since the stored feature, if it is one of the N pre-registered features, is the basis for one of the N shared keys). It will be appreciated that the system obtains the shared key from the matched feature at stage 217 in the same manner that the system obtained the shared keys from pre-registered features at stage 203 discussed above (e.g., if the feature itself is used as a shared key at stage 203, the shared key obtained at stage 217 is the same as the pre-registered feature; if the shared key is otherwise derived from the feature at stage 2013, the shared key obtained at stage 217 is derived in the same manner from the matched feature at stage 217).

Stages 215 and 217 may be repeated for multiple features of the input received at stage 213 until the system has a sufficient subset of the N shared keys (i.e., at least K shared keys) corresponding to the N pre-registered features for deriving the secret key. Then, at stage 219, the secret key is derived using the at least K shared keys together with the shared key parameters corresponding to the at least K shared keys.

The secret key is then used at stage 221 to decrypt the element that was encrypted at stage 207 discussed above.

It will be appreciated that if an invalid, current input is provided at stage 213, the matching at stage 215 will not succeed and the system will not be able to obtain the shared keys needed to derive the secret key.

In view of FIGS. 2A and 2B and the corresponding discussion, it can be seen that this exemplary embodiment of the invention provides for a much higher level of security than conventional systems. By utilizing additional features stored alongside N pre-registered features together with the shared key scheme, an unauthorized user cannot derive the secret key needed to gain access to a protected network or system or protected data even if the unauthorized user manages to gain access to the database where the N pre-registered features are stored. Further, the unauthorized user is not able to derive the secret key without actually having possession of at least a minimum number K of the N keys used to generate the secret key, so the unauthorized user cannot bypass the security of the system simply by rigging a Boolean matching operation to return a positive result.

In an exemplary implementation of the embodiment discussed above with respect to FIGS. 2A-2B, scale-invariant feature transform (SIFT) features are calculated for an image of a user's face. These SIFT features have 128 dimensions and are normalized. Each feature is rounded appropriately and stored by using 1 byte for each dimension. For example, from an image of a user's face 100 SIFT features may be derived. Then, by concatenating each dimension, a 128-byte value corresponding to each feature may be obtained and hashed, with the hash result being used as a shared key. A secret key S is generated from the 100 shared keys corresponding to the 100 SIFT features (e.g., using Shamir's secret sharing scheme or any other secret sharing scheme), with at least K number of the shared keys being needed to derive the secret key 5, and the 100 SIFT features are stored together with a number (e.g., 1000) of additional SIFT features.

In an example, according to Shamir's scheme, the dimensions of each of the 100 features are extended by one and a shared key parameter from Shamir's scheme is stored in the last dimension. Similarly, the dimensions of each of the 1000 additional feature are also extended by one using random values of similar type to the last dimension of the 100 features.

As discussed above, the secret key S is used to encrypt an authentication token or data, and, in this example, there are 1100 total features having an extended dimension that are stored.

When a user wants to perform authentication or decrypt data, SIFT features are derived from a current input image of the user's face. The SIFT features are matched to the 1100 stored features, and if there are at least K matches, the last dimension of each matching feature, together with the matching features, are used to derive the secret key S using Shamir's scheme. The secret key S can then be used to decrypt the authentication token or data.

It will be appreciated that Shamir's scheme utilizes a polynomial to derive a shared secret. Further, a prime p is generated pursuant to Shamir's scheme, which may also be stored in stage 211 discussed above. If out of N total shared keys, K keys are required, then the following polynomial may be utilized to derive pairs of a shared key plus its corresponding shared key parameter:

$$f(x) = S + a_1 * x + a_2 * x^2 + \ldots + a_{k-1} * x^{(k-1)}$$

where S is the secret key, x is a shared key, $a_1$ through $a_{k-1}$ are coefficients, and f(x) (mod p) is a shared key parameter or where S is the secret key, x is a shared key parameter, $a_1$ through $a_{k-1}$ are coefficients and f(x) (mod p) is a shared key.

In order to determine a shared key plus its corresponding shared key parameter (x, f(x) (mod p)), the following formula may be applied:

$$\begin{aligned} f(x)(\bmod p) &= (S + a_1 * x + a_2 * x^2 + \ldots + a_{(k-1)} * x^{\wedge}(k-1))(\bmod p) \\ &= (S(\bmod p) + a_1 * x(\bmod p) + a_2 * x^{\wedge}2(\bmod p) + \ldots + \\ &\quad a_{(k-1)} * x^{\wedge}(k-1)(\bmod p))(\bmod p) \\ &= (S + ((a_1(\bmod p)) * (x(\bmod p)))(\bmod p) + \ldots + \\ &\quad ((a_{(k-1)}(\bmod p)) * (x^{\wedge}(k-1)(\bmod p)))(\bmod p))(\bmod p) \end{aligned}$$

It will be appreciated that p>S.

A ModA vector may be calculated according to the following:

$$\text{Mod } A[i] = a_i (\bmod p)$$

It will be appreciated that ModA may be reused for all features and thus may be calculated only once.

In an example where each feature is used as x and used to calculate the value of f(x), the process may be simplified by recursively calculating $(x^i)$ (mod p) according to the following procedure:

```
Initialize: ModX[1:k-1] = null
CalculateModX(x,p,i):
    If ModX[i] != null
        return ModX[i]
    If k == 1
        ModX[1] = x (mod p)
    else
        ModX[i] = (CalculateModX(x,p,i-1) (mod p) *
        CalculateModX(x,p,1) (mod p) ) (mod p)
    return ModX[i]
```

ModX[i] is equivalent to $(x^i)$ (mod p), and the CalculateModX(x,p,k-1) call will calculate the complete ModX vector/array.

As discussed in the foregoing example, the features may be used as x with f(x) being derived from x and S, or, in an alternative example, the features are used as f(x) with x being derived from f(x) and S.

Figure 3A:
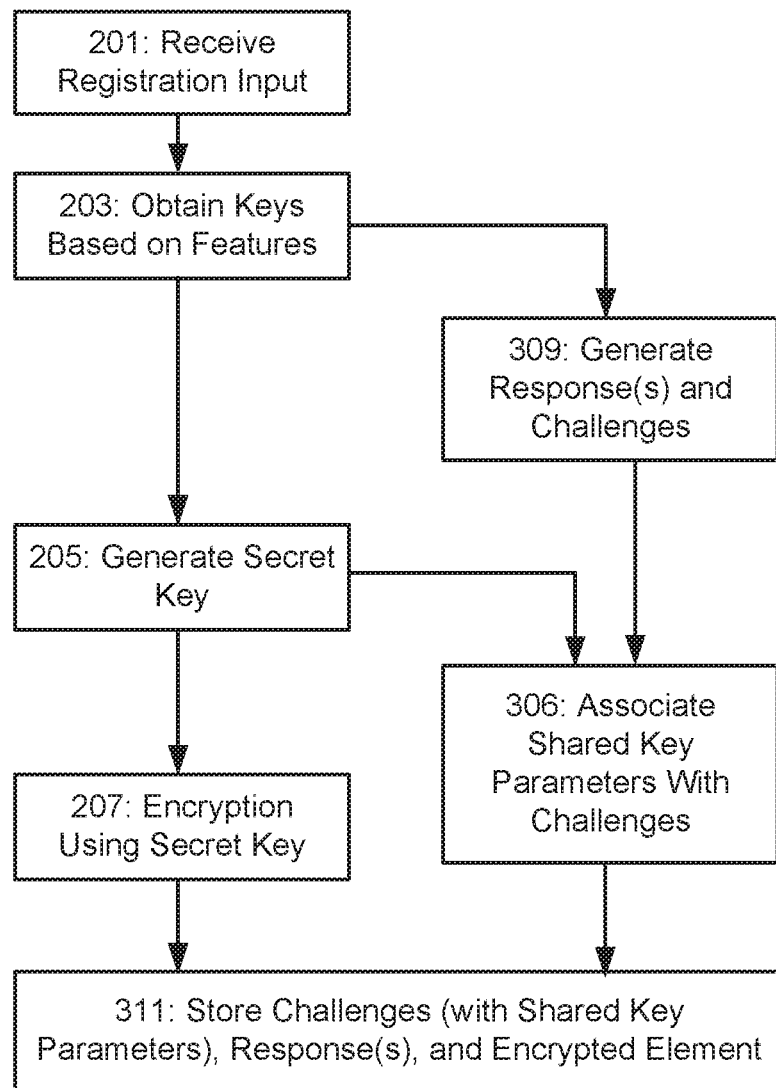
FIG. 3A is a flowchart illustrating an exemplary process for registration of an input.

FIG. 3A is a flowchart illustrating an exemplary process 300a for registration of an input in another exemplary embodiment. Stages 201, 203, 205 and 207 are performed as discussed above with respect to FIG. 2A.

However, in the process 300a of FIG. 3A, the N shared keys used for generating the secret key at stage 205 are further used to generate challenge-response pairs at stage 309. Each challenge-response pair includes a challenge (e.g., which may be a predetermined or randomly generated string encrypted by one of the N shared keys), and a response (e.g., the predetermined or randomly generated string in decrypted form). It will be appreciated that in one exemplary implementation, a single response may be used with the N shared keys to generate N challenges, and that in another exemplary implementation, N responses may be used with the N shared keys to generate N challenges.

It will be appreciated that using a single response may be more efficient than using multiple responses. By using a single response, less computational work is required in generating the responses (only one response instead of N responses), as well as less computational work being required to test the shared keys (one test per key corresponding to the one response instead of N tests per key corresponding to the N responses). However, it will be appreciated that because relatively less computational work is needed, relatively less computational work may be needed in theory for an attacker as well.

At stage 306, after the secret key is generated at stage 205 according to a shared secret scheme such as Shamir's scheme, shared key parameters corresponding to each of the N shared keys are associated together with corresponding challenges of the N challenges. For example, the N challenges may be single-dimension parameters, and a shared key parameter corresponding to each challenge may be concatenated with the respective challenge to facilitate storing each challenge together with a corresponding shared key parameter.

At stage 311, the response(s), challenges (with corresponding shared key parameters) and the encrypted element are stored, while the N pre-registered features do not need to be stored (nor do any additional features or any shared keys or secret key need to be stored).

In an alternative implementation (not depicted in FIG. 3A), where N responses are stored at stage 311, it will be appreciated that the shared key parameters may be associated with respective responses at stage 306 such that the N responses are stored with the shared key parameters at stage 311.

FIG. 33 is a flowchart illustrating an exemplary process 300b for deriving and using the secret key based on an input, corresponding to the registration process 300a of FIG. 3A. At stage 213, similar to the process 200b of FIG. 2B, the user provides a current, valid input corresponding to a previously registered input.

At stage 315, a shared key is obtained based on a feature of the input, and the shared key is tested at stage 317 based on the stored challenges and response(s) (e.g., by applying the shared key to each challenge to determine whether the key can decrypt a challenge so as to obtain a response that matches a stored response; or by applying the key to the response(s) to determine whether the key can encrypt the response(s) so as to obtain a challenge that matches a stored challenge). If a shared key successfully decrypts a challenge or successfully encrypts a response so as to obtain a matching stored response or stored challenge, respectively, the shared key is determined to be a shared key that may be used in stage 219 to derive the secret key.

Stages 315 and 317 may be repeated for multiple features of the input received at stage 213, or, alternatively, stage 315 itself may be repeated for multiple features of the input with multiple shared keys being tested thereafter at stage 317. Either way, if the system has a sufficient subset of the N shared keys (i.e., at least K shared keys) corresponding to the N pre-registered feature after stage 317, the system is then able to use those at least K shared keys together with corresponding shared key parameters to derive the secret key at stage 219. The secret key is then used at stage 221 to decrypt the encrypted element (as discussed above with respect to FIG. 23).

It will be appreciated that if an invalid, current input is provided at stage 213, the shared keys obtained at stage 315 based on the invalid input will not be able to successfully decrypt challenges or successfully encrypt response(s) at stage 317.

Figure 3B:
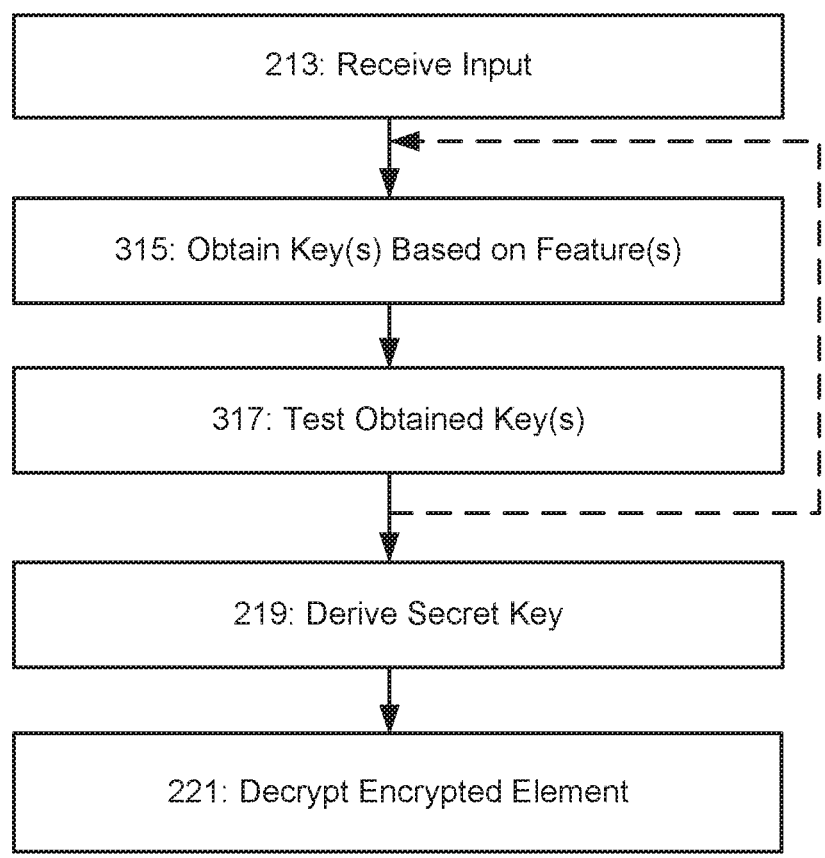
FIG. 3B is a flowchart illustrating an exemplary process for deriving and using a secret key based on an input.

In view of FIGS. 3A and 3B and the corresponding discussion, it can be seen that this exemplary embodiment of the invention provides for a much higher level of security than conventional systems. By utilizing the challenge-response process based on features of an input together with the shared key scheme, an unauthorized user cannot derive the secret key needed to gain access to a protected network or system or protected data even if the unauthorized user manages to gain access to the database where the challenges and responses are stored, as using an appropriate algorithm for encrypting the challenges using the N keys renders it impossible or very difficult to derive the N keys simply based on the stored challenge-response pairs. Further, an unauthorized user cannot bypass the security of the system simply by rigging a Boolean matching operation to return a positive result, as deriving the secret key requires possession of at least K shared keys of the N shared keys of the secret sharing scheme for the secret key.

It will be appreciated that the processes depicted in FIGS. 3A-3B may be relatively computationally expensive (e.g., each shared key obtained in stage 315 being used to attempt to decrypt all challenges in stage 317, except perhaps where certain challenge decryption attempts may be eliminated due to a successful challenge decryption that eliminates the need for further attempts with respect to a particular challenge and/or shared key), but storing challenges and response(s) at stage 311 has the advantage of requiring relatively little storage, and utilizing the challenge-response process with the shared key scheme as discussed with respect to FIGS. 3A-3B may have certain advantages in terms of security as well.

It will be appreciated that, in general, to successfully decrypt a challenge, an exact key corresponding to an exact feature would normally be required. To accommodate environmental conditions which might cause a key corresponding to a valid input feature to depart from a prestored key corresponding to the same input feature, features within a certain range of the input feature may be considered. This provides the system with more flexibility but may increase the computational costs. To provide a simplified illustrative example, in a situation where a three-dimensional input feature is represented by a vector [x, y, z], and a tolerance of distance R=1 is provided, the system would not only test a key based on the input vector [x, y, z] against the stored challenge-response pairs, it would also test six additional keys ([x+1, y, z], [x−1, y, z], [x, y+1, z], [x, y−1, z] [x, y, z+1], [x, y, z−1]) against the stored challenge-response pairs. This way, if a valid key were based on a feature that is within a distance R=1 of the input feature corresponding to [x, y, z], the system would still be able to determine the valid key despite the input feature not being exactly the same as the feature upon which the valid key is based. It will be appreciated that exemplary implementations of the system where features within a certain range of the input feature are considered may utilize relatively more sophisticated processes than the simplified illustrative example provided here.

In an exemplary implementation of the exemplary embodiment discussed above with respect to FIGS. 3A-3B, SIFT features are calculated for an image of a user's face. These SIFT features have 128 dimensions and are normalized. Each feature is rounded appropriately and stored by using 1 byte for each dimension. For example, from an image of a user's face 100 SIFT features may be derived. Then, by concatenating each dimension, a 128-byte value corresponding to each feature may be obtained and hashed, with the hash result being used as a shared key. A secret key S is generated from the 100 shared keys corresponding to the 100 SIFT features (e.g., using Shamir's secret sharing scheme), with at least K number of the shared keys being needed to derive the secret key S. 100 shared key parameters corresponding to the 100 shared keys are also generated.

In this example, a plain response is randomly generated and encrypted by the 100 shared keys corresponding to the 100 features to create challenges. Each challenge is stored with a corresponding shared key parameter (of the corresponding shared key used to generate the respective challenge). The response is also stored. Thus, in this example, there are 100 challenges and 1 response that are stored.

When a user wants to perform authentication or decrypt data, SIFT features are derived from a current input image of the user's face. The SIFT features are then used to derive shared keys (i.e., by hashing), and the shared keys are used to attempt to encrypt the stored response. If there are at least K shared keys that are able to encrypt a response to obtain one of the challenges (without the associated shared key parameters), the shared key parameters for Shamir's scheme that were stored with each challenge corresponding to the at least K shared keys, together with the at least K shared keys, are used to derive the secret key S. The secret key S can then be used to decrypt the authentication token or data.

Figure 4:
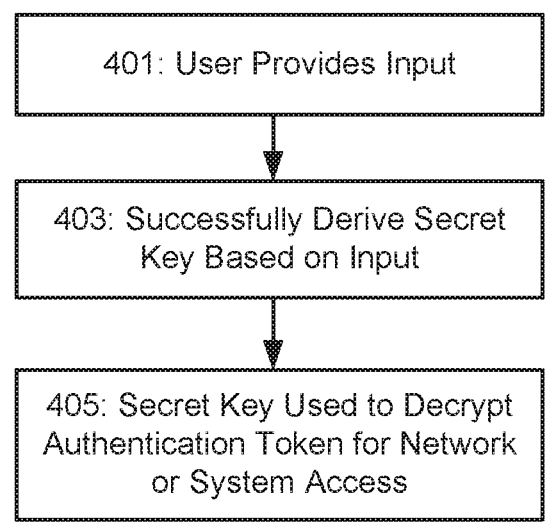
FIG. 4 is a flowchart illustrating an exemplary process for providing authentication of a user in a network application.

FIG. 4 is a flowchart illustrating an exemplary process 400 for using the secret key scheme to restrict access to a network or system. At stage 401, a user of a device provides an input. At stage 403, a processing system successfully derives a secret key based on features of the input, for example as discussed above with respect to FIGS. 2A-2B or 3A-3B. At stage 405, the secret key is used to decrypt an authentication token, which provides the user with access to a network or system.

Figure 5:
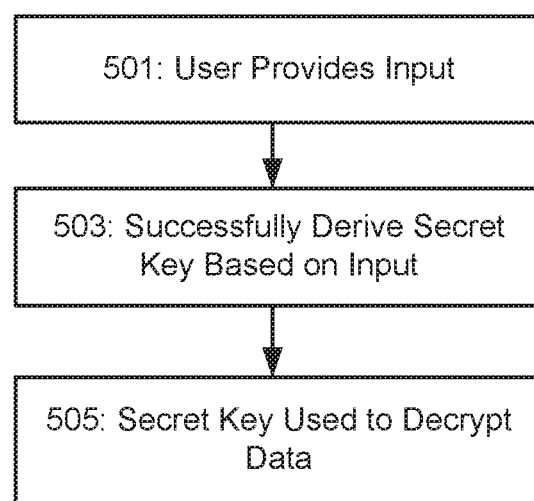
FIG. 5 is a flowchart illustrating an exemplary process for providing authentication of a user for data access.

FIG. 5 is a flowchart illustrating an exemplary process 500 for using the secret key scheme to restrict access to data. At stage 501, a user of a device provides an input. At stage 503, a processing system successfully derives a secret key based on features of the input, for example as discussed above with respect to FIGS. 2A-2B or 3A-3B. At stage 505, the secret key is used to decrypt data that was previously encrypted based on the secret key.

Figure 6:
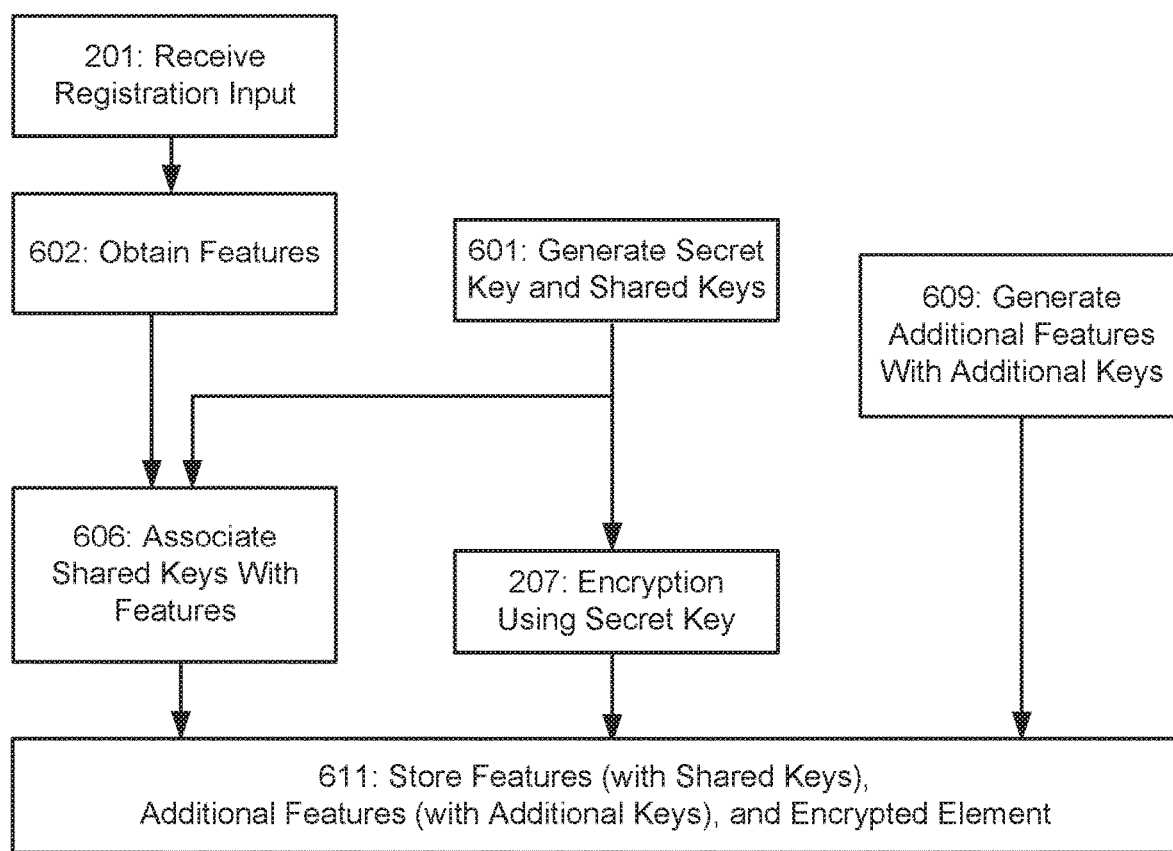
FIG. 6 is a flowchart illustrating an exemplary process for registration of an input.

FIG. 6 is a flowchart illustrating an exemplary process 600 for registration of an input according to yet another exemplary embodiment. In this exemplary embodiment, the secret key S and N shared keys are generated according to a secret sharing scheme (e.g., Shamir's scheme, Blakley's scheme, the Chinese remainder theorem, or any other secret sharing scheme) at stage 601 (e.g., the secret key S or the N shared keys may be generated randomly) independently of the features obtained at stage 602 from a registration input received at stage 201. The number N of shared keys generated at stage 601 may correspond to the number N of features obtained at stage 602.

Each shared key is then associated with a feature at stage 606, for example, by extending the dimensions of the features by one and storing a corresponding shared key in the extended dimension (similar to the discussion above with respect to stage 206 of FIG. 2A where shared key parameters are stored in extended dimensions of corresponding features) Further, additional features with additional keys are generated at stage 609 having a same or similar format as the features with associated shared keys at stage 606. For example, the format of the additional features with additional keys may be similar to or the same as the format of the features with an extended dimension for holding a shared key (similar to the discussion above with respect to stage 209 of FIG. 2A where additional features with additional parameters are generated).

At stage 611, the N pre-registered features of the registration input, together with the shared keys (which may, for example, stored in an extra dimension of each corresponding feature) are stored together with the additional features (with additional keys). Further, an element (such as an authentication token or data) is encrypted at stage 207 using the secret key and is also stored at stage 611 in encrypted form.

It will be appreciated that the exemplary process 200b of FIG. 2B for deriving and using the secret key based on a valid, current input, can also be used with the process 600 for registration in a similar manner as discussed above, except that at stage 217, to obtain a shared key based on a matched feature, the shared key is obtained based on the association between the feature and the key (e.g., by accessing the extended dimension of a matched feature).

It will further be appreciated that to the extent the secret sharing scheme used in FIG. 6 utilizes a shared key parameter corresponding to each shared key (such as the case with Shamir's scheme), the shared key parameter may be stored together with a corresponding feature and shared key (e.g., stored in a further extended dimension).

Figure 7:
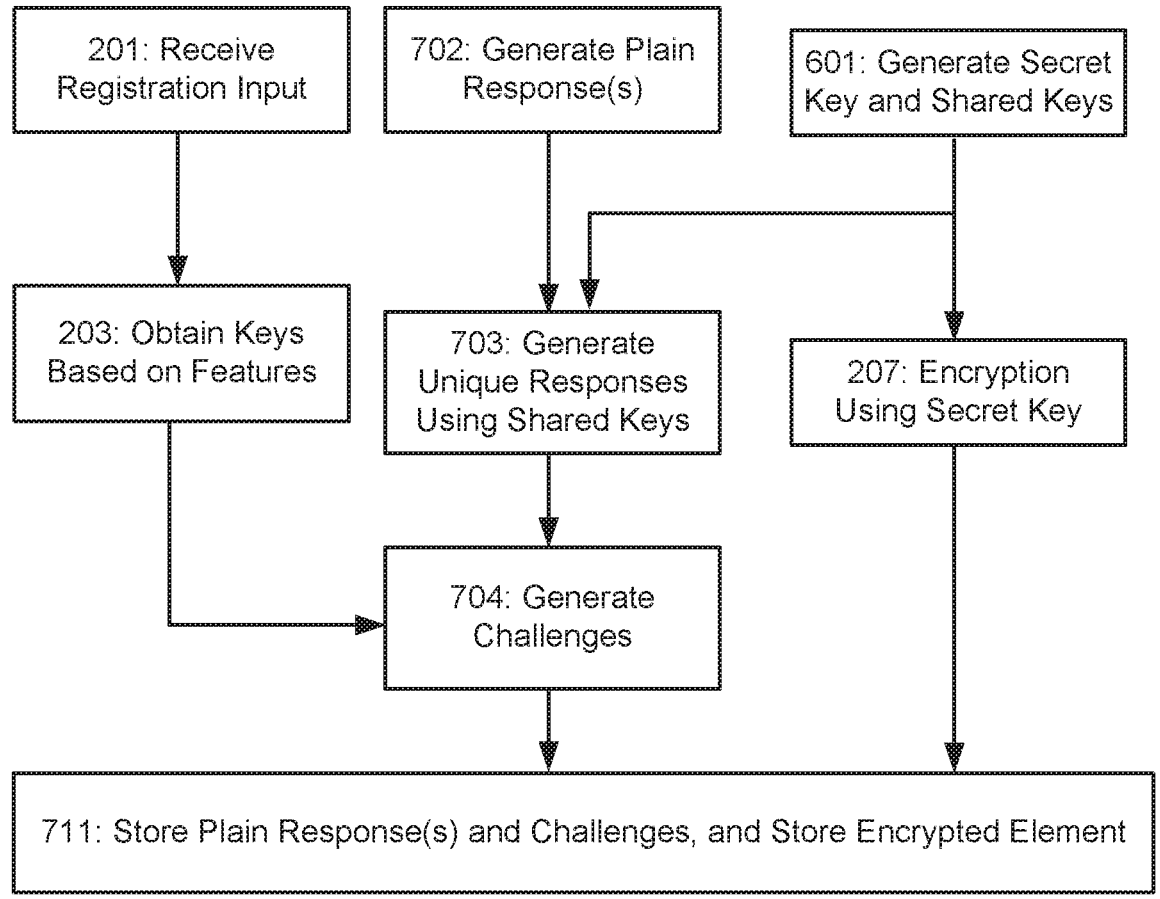
FIG. 7 is a flowchart illustrating an exemplary process for registration of an input.

FIG. 7 is a flowchart illustrating an exemplary process 700 for registration of an input according to yet another exemplary embodiment. Similar to FIG. 6, the secret key S and N shared keys are generated at stage 601 independently of N features according to a secret sharing scheme. Additionally, one or more plain responses is generated at stage 702, and each of the N shared keys is combined with the single plain response or with one of the multiple plain responses (e.g., by appending or pre-pending) at stage 703 to generate N unique responses.

A registration input is received at stage 201, and N feature keys are obtained from the features of the registration input at stage 203 in a similar manner as discussed above with respect to stage 203 of FIG. 2A. The feature keys are then used to encrypt the N unique response generated at stage 703 to generate N challenges at stage 704, with each of the N challenges forming a challenge-response pair with respect to a corresponding unique response. The plain response(s) from stage 702 and the encrypted challenges are stored at stage 711.

Further, similar to discussion above with respect to FIG. 3A, an element (such as an authentication token or data) is encrypted at stage 207 and also stored at stage 711.

It will be appreciated that the exemplary process 300b of FIG. 3B for deriving and using the secret key based on a valid, current input, can also be used with the process 700 for registration in a similar manner as discussed above except that at stage 317, when a feature key successfully decrypts a challenge, a shared key is obtained based on the unique response corresponding to the challenge (e.g., where the unique response comprises a shared key plus a plain response appended or pre-pended, the unique response without the plain response portion constitutes a shared key that can be used to derive the secret key at stage 219).

It will further be appreciated that to the extent the secret sharing scheme used in FIG. 7 utilizes a shared key parameter corresponding to each shared key (such as the case with Shamir's scheme), the shared key parameter may be integrated into the unique responses (e.g., via concatenation), or associated with challenges (as discussed above with respect to FIG. 3A).

In a further exemplary embodiment, certain key(s) of the N keys used to generate the secret key are designated as required key(s), such that even if a system has K of the N keys, the system will not be able to derive the secret key if the K keys do not include the required key(s). In one exemplary implementation, the N keys used to generate a secret key may include (N−x) number of keys based on (N−x) number of features of a pre-registered biometric input and x number of required keys, where the x number of required keys are stored on a two-factor authentication device such as a Bluetooth dangle. The secret key would thus not be derivable unless a valid biometric input is provided in addition to the Bluetooth dangle. Exemplary methods for secret sharing with required shared key(s) are described in U.S. application Ser. No. 15/264,055, filed on Sep. 13, 2016, which is incorporated by reference herein in its entirety.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A non-transitory computer-readable medium having processor-executable instructions stored thereon for secret sharing based on multiple features of an input, the processor-executable instructions, when executed, facilitating performance of the following:
   receiving a registration input from a user;
   obtaining features from the registration input;
   obtaining a plurality of shared keys based on the features of the registration input;
   generating a secret key according to a shared secret scheme and the plurality of shared keys;
   generating a plurality of challenge-response pairs using the plurality of shared keys, wherein each challenge-response pair includes a response corresponding to a string in decrypted form and a challenge corresponding to the string of the response in the challenge-response pair encrypted by one of the plurality of shared keys;
   associating a shared key parameter of each shared key with a respective challenge;
   storing each challenge with its associated shared key parameter and storing each response; and
   encrypting an element to be protected by the secret key using the secret key.

2. The non-transitory computer-readable medium according to claim 1, wherein the shared secret scheme is based on Shamir's scheme, Blakley's scheme, or the Chinese remainder theorem.

3. The non-transitory computer-readable medium according to claim 1, Wherein obtaining the plurality of shared keys based on the features of the registration input further comprises:
   applying binary concatenation to each feature of the registration input to obtain each respective shared key.

4. The non-transitory computer-readable medium according to claim 1, Wherein obtaining the plurality of shared keys based on the features of the registration input further comprises:
   applying a hashing algorithm to each feature of the registration input to obtain each respective shared key.

5. The non-transitory computer-readable medium according to claim 1, wherein obtaining the plurality of shared keys based on the features of the registration input further comprises:
   using each feature of the registration input as each respective shared key.

6. The non-transitory computer-readable medium according to claim 1, wherein the same response is used for each of the plurality of challenge-response pairs.

7. The non-transitory computer-readable medium according to claim 1, wherein a plurality of responses are used for the plurality of challenge-response pairs.

8. The non-transitory computer-readable medium according to claim 7, wherein each response is stored with an associated shared key parameter.

9. The non-transitory computer-readable medium according to claim 1, wherein each challenge of the challenge-response pairs is a single-dimension parameter.

10. A method for secret sharing based on multiple features of an input, the method comprising:
    receiving, by a computing system, a registration input from a user;
    obtaining, by the computing system, features from the registration input;

obtaining, by the computing system, a plurality of shared keys based on the features of the registration input;

generating, by the computing system, a secret key according to a shared secret scheme and the plurality of shared keys;

generating, by the computing system, a plurality of challenge-response pairs using the plurality of shared keys, wherein each challenge-response pair includes a response corresponding to a string in decrypted form and a challenge corresponding to the string of the response in the challenge-response pair encrypted by one of the plurality of shared keys;

associating, by the computing system, a shared key parameter of each shared key with a respective challenge;

storing, by the computing system, each challenge with its associated shared key parameter and storing each response; and encrypting, by the computing system, an element to be protected by the secret key using the secret key.

11. The method according to claim 10, wherein the shared secret scheme is based on Shamir's scheme, Blakley's scheme, or the Chinese remainder theorem.

12. The method according to claim 10, wherein obtaining the plurality of shared keys based on the features of the registration input further comprises:

applying binary concatenation to each feature of the registration input to obtain each respective shared key.

13. The method according to claim 10, wherein obtaining the plurality of shared keys based on the features of the registration input further comprises:

applying a hashing algorithm to each feature of the registration input to obtain each respective shared key.

14. The method according to claim 10, wherein obtaining the plurality of shared keys based on the features of the registration input further comprises:

using each feature of the registration input as each respective shared key.

15. The method according to claim 10, wherein the same response is used for each of the plurality of challenge-response pairs.

16. The method according to claim 10, wherein a plurality of responses are used for the plurality of challenge-response pairs.

17. The method according to claim 16, wherein each response is stored with an associated shared key parameter.

18. The method according to claim 10, wherein each challenge of the challenge-response pairs is a single-dimension parameter.

19. A non-transitory computer-readable medium having processor-executable instructions stored thereon for secret sharing based on multiple features of an input; the processor-executable instructions, when executed, facilitating performance of the following:

receiving a registration input from a user;

obtaining features from the registration input;

obtaining a plurality of feature keys based on the features of the registration input;

generating a secret key and a plurality of shared keys according to a shared secret scheme;

generating a plurality of challenge-response pairs using the plurality of shared keys, wherein each challenge-response pair includes a unique response generated from a plain response and a shared key, and further includes a challenge corresponding to the unique response in the challenge-response pair encrypted by one of the plurality of feature keys;

associating a shared key parameter of each shared key with a respective challenge;

storing each challenge and each plain response; and encrypting an element to be protected by the secret key using the secret key.

20. The non-transitory computer-readable medium according to claim 19, wherein the shared secret scheme is based on Shamir's scheme, Blakley's scheme, or the Chinese remainder theorem.

* * * * *